(12) United States Patent
Aqrawi et al.

(10) Patent No.: US 11,199,642 B2
(45) Date of Patent: Dec. 14, 2021

(54) ADAPTIVE SIGNAL DECOMPOSITION

(71) Applicant: Schlumberger Technology Corporation, Sugar Land, TX (US)

(72) Inventors: Ahmed Adnan Aqrawi, Stavanger (NO); Mats Stivang Ramfjord, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 508 days.

(21) Appl. No.: 16/086,601

(22) PCT Filed: Mar. 30, 2016

(86) PCT No.: PCT/IB2016/000525
§ 371 (c)(1),
(2) Date: Sep. 20, 2018

(87) PCT Pub. No.: WO2017/168191
PCT Pub. Date: Oct. 5, 2017

(65) Prior Publication Data
US 2019/0086565 A1    Mar. 21, 2019

(51) Int. Cl.
*G01V 1/30*     (2006.01)
*G01V 1/32*     (2006.01)

(52) U.S. Cl.
CPC .............. *G01V 1/306* (2013.01); *G01V 1/301* (2013.01); *G01V 1/32* (2013.01); *G01V 2210/43* (2013.01)

(58) Field of Classification Search
CPC .......... G01V 1/306; G01V 1/301; G01V 1/32; G01V 2210/43
See application file for complete search history.

(56) References Cited

U.S. PATENT DOCUMENTS

| | | | |
|---|---|---|---|
| 2007/0104335 A1* | 5/2007 | Shi ........................ | H04R 3/02 381/93 |
| 2015/0168574 A1 | 6/2015 | Wallet et al. | |
| 2017/0176614 A1* | 6/2017 | Alhukail ................. | G01V 1/30 |
| 2017/0212260 A1* | 7/2017 | Padhi ..................... | G01V 1/306 |

FOREIGN PATENT DOCUMENTS

CA      2760662 A1     12/2010

OTHER PUBLICATIONS

Jimenez, et al., "Source Parameters of Earthquakes Recorded Near the Itoiz Dam (Northern Spain)," Pure and Applied Geophysics, Birkhaeuser Verlag, Basel, CH, vol. 172, Issue 11, Nov. 2015, pp. 3163-3177.
International Search Report and Written Opinion for the equivalent International patent application PCT/IB2016/000545 dated Jul. 22, 2016.

* cited by examiner

*Primary Examiner* — Alexander Satanovsky

(57) ABSTRACT

A disclosed method for wellsite operations includes obtaining a spectral decomposition, of a seismic data associated with a geological formation. The spectral decomposition includes a first spectral representation generated using a first operator and a second spectral representation generated using a second operator. The method also includes determining a first characteristic of the first operator and a second characteristic of the second operator. The method further includes determining at least one acceptable operator based on the first characteristic and the second characteristic. The method also includes generating a geological model feature using the at least one acceptable operator.

12 Claims, 14 Drawing Sheets

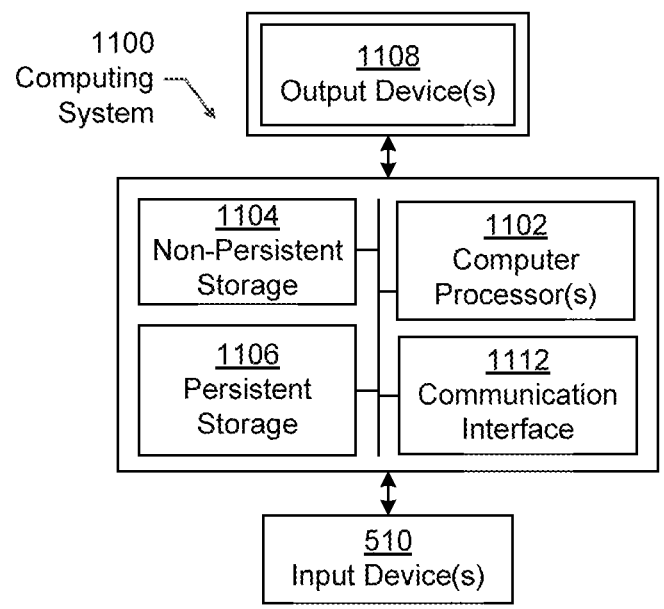
FIG. 11.1
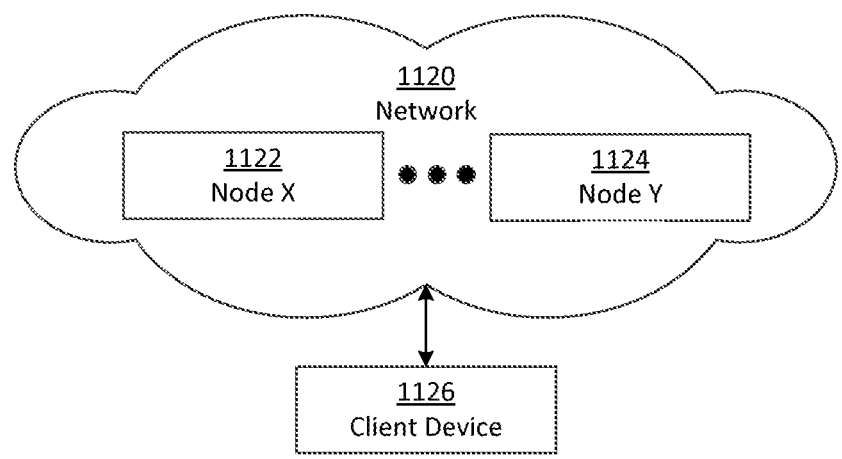
FIG. 11.2

ADAPTIVE SIGNAL DECOMPOSITION

BACKGROUND

Hydrocarbon fluids, such as oil and natural gas, are obtained from a subterranean geologic formation, referred to as a reservoir, by drilling a well that penetrates the hydrocarbon-bearing formation. Different wells may have different structures including the length, radius, and direction of the wellbores that make up the structure of the well and completion components located within each of the wellbores.

SUMMARY

In one aspect, a method for wellsite operations in accordance with one or more embodiments includes obtaining a spectral decomposition, of a seismic data associated with a geological formation. The spectral decomposition includes a first spectral representation generated using a first operator, and a second spectral representation generated using a second operator. The method further includes determining a first characteristic of the first operator and a second characteristic of the second operator; determining at least one acceptable operator based on the first characteristic and the second characteristic; and generating a geological model feature using the at least one acceptable operator.

In one aspect, a system for extracting fluids in accordance with one or more embodiments includes a data repository for storing a geological model of a geological formation based on, in part, a seismic data associated with the geological formation. The system also includes a computer processor, operatively connected to the data repository, for executing a seismic data analyzer that obtains a spectral decomposition, of the seismic data, using at least one operator, and determines a characteristic of the at least one operator associated with the spectral decomposition. The computer processor is also for executing a geological model generation engine that determines at least one acceptable operator based on the characteristic of the at least one operator. The computer processor is further for generating a geological model feature using the at least one acceptable operator.

In one aspect, a non-transitory computer readable medium for wellsite operations, the non-transitory computer readable medium including computer readable program code for obtaining a spectral decomposition, of a seismic data associated with a geological formation, including a first spectral representation generated using a first operator, a second spectral representation generated using a second operator; determining a first characteristic of the first operator and a second characteristic of the second operator; determining at least one acceptable operator based on the first characteristic and the second characteristic; and generating a geological model feature using the at least one acceptable operator.

BRIEF DESCRIPTION OF DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

FIG. 11.1 shows a schematic diagram of a system in accordance with one or more embodiments.

FIG. 11.2 shows a schematic diagram of a network system in accordance with one or more embodiments.

DETAILED DESCRIPTION

Figure 1:
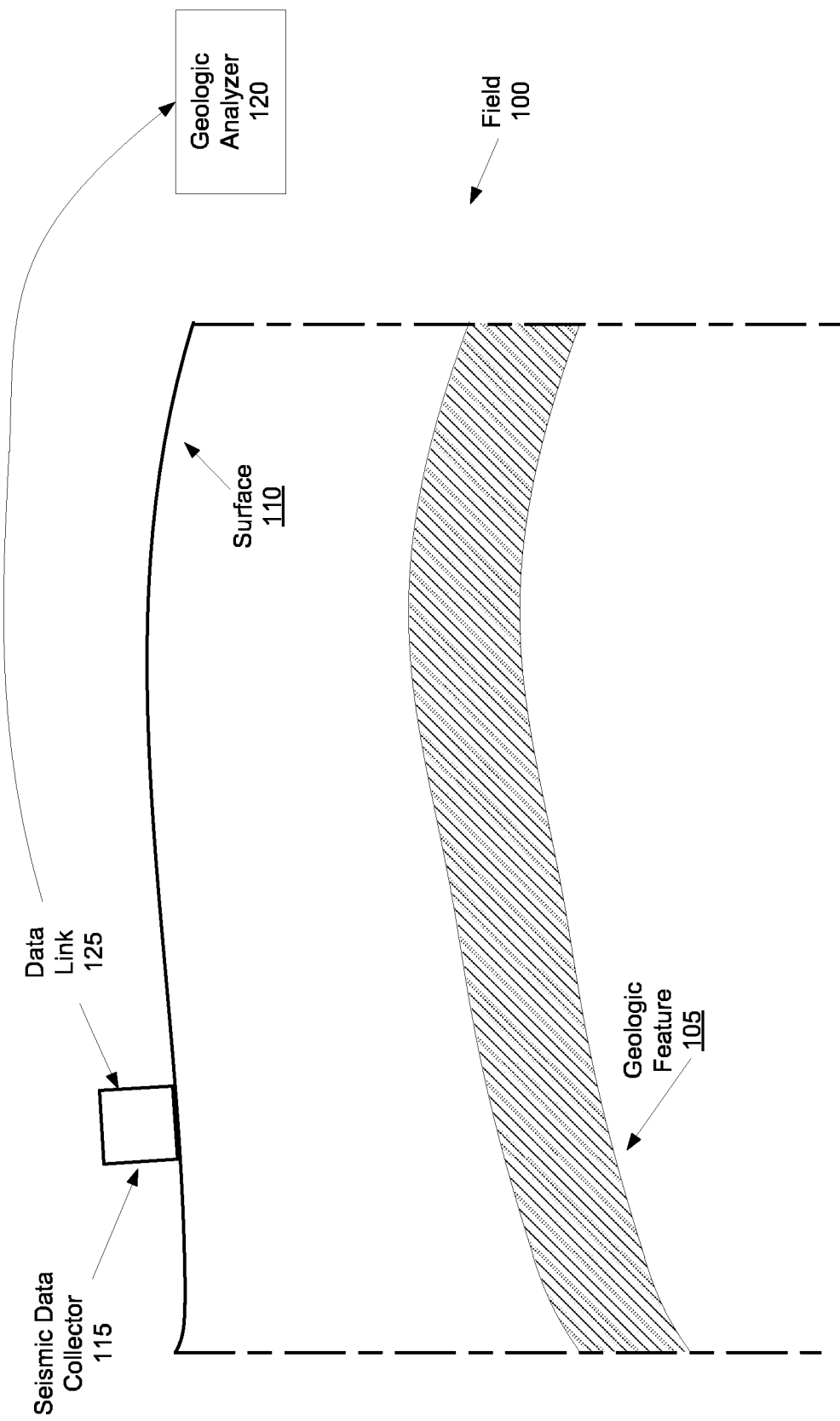
FIG. 1 shows a schematic diagram of a wellsite in accordance with one or more embodiments.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to methods of performing wellsite operation. In particular, the wellsite operation may be performed in accordance with an extraction plan. The extraction plan may include one or more actions. The actions may be, for example, boring of a wellbore at a specified location, directional drilling of a wellbore, insertion of completion components in a wellbore, or any other type of wellsite operation.

The extraction plan may be based on a geological model of a geological formation near the wellsite. For example, the wellsite may sit directly on the geological formation, the wellsite may be near the geological formation, and/or one of the actions performed at the wellsite may interact with the geological formation.

The geological model may include one or more geological model features. The one or more geological features may represent one or more physical features of the geological formation. The physical features of the geological formation may be, for example, one or more layers of sandstone, one or more layers of limestone, one or more layers of shale, one or more layers of sand layer, one or more layers of turbidite, and/or one or more fault lines. The presence of any of these physical features and the characteristics of each feature that is present may cause one or more actions of the extraction plan to be generated, modified, and/or removed.

The geological model features may be based on one or more seismic data. The seismic data may be, for example, seismic reflection data of the geological formation. In one or more embodiments, the seismic data may be stored in a data repository.

In one or more embodiments, the seismic data may be generated by performing a seismic measurement of a geological feature as shown in FIG. 1. FIG. 1 depicts a schematic view, partially in cross section, of a field (100) in which one or more embodiments may be implemented. In one or more embodiments, the field may be an oilfield. In other embodiments, the field may be a different type of field. In one or more embodiments, one or more of the modules and elements shown in FIG. 1 may be omitted, repeated, and/or substituted. Accordingly, embodiments should not be considered limited to the specific arrangements of modules shown in FIG. 1.

As shown in FIG. 1, a geological feature (105) of a geological formation may be located below a surface (110) of the geological formation. As discussed above, the geological feature (105) may be for example, one or more layers of sandstone, one or more layers of limestone, one or more layers of shale, one or more layers of sand layer, one or more layers of turbidite, and/or one or more fault lines.

In one or more embodiments, various survey tools and/or data acquisition tools are adapted to measure the geological feature (105) and detect the characteristics of the geological feature (105) of the geological formation. In one or more embodiments, the survey tools and/or data acquisition tools may include a seismic data collector (115). The seismic data collector (115) may be a physical device that utilizes acoustic energy to interrogate the geological feature (105). The seismic data collector (115) may include an acoustic energy generator that generates acoustic waves and directs at least a portion of the generated waves towards the geological feature (105). The portion of the acoustic waves may be scattered by the geological feature (105) and at least a portion of the scattered waves may be received by a receiver of the seismic data collector (115). The seismic data collector (115) may record the received scattered waves and thereby generate a relationship between received acoustic energy versus time.

While the seismic data collector (115) has been described as having a single acoustic generator and single acoustic receiver, the seismic data collector (115) may include multiple generators and multiple receivers. In addition, the generators and receivers may be located at different spatial locations and thereby relationships between received acoustic energy versus time at various locations may be generated.

In one or more embodiments, the seismic data collector (115) may be connected by a data link (125) to a geologic analyzer (120). As will be discussed in detail below, the geologic analyzer (120) may generate an extraction plan based on seismic data. The data link (125) may enable the seismic data collector (115) to send seismic data of the geologic formation to the geologic analyzer (120). In one or more embodiments, the data link (125) may be an operable connection. For example, the operable connection may be a wired or wireless data communications link. In one or more embodiments, the data link may be a physical transfer of the seismic data by way of physical transport of a non-transitory computer readable storage medium from the seismic data collector (115) to the geologic analyzer (120). The non-transitory computer readable storage medium, may be, for example, a universal serial bus flash memory stick, a memory card, or any other computer readable physical medium.

While FIG. 1 is illustrating as being on land, e.g., the seismic data collector (115) on surface (110), one or more embodiments are not limited to locations on land. One or more embodiments are located under a body of water. For example, the seismic data collector (115) shown in FIG. 1 may be mounted on an boat or other seafaring vehicle, may be mounted on a flotation device such as a buoy, and/or may be mounted to an aerial vehicle.

Figure 2:
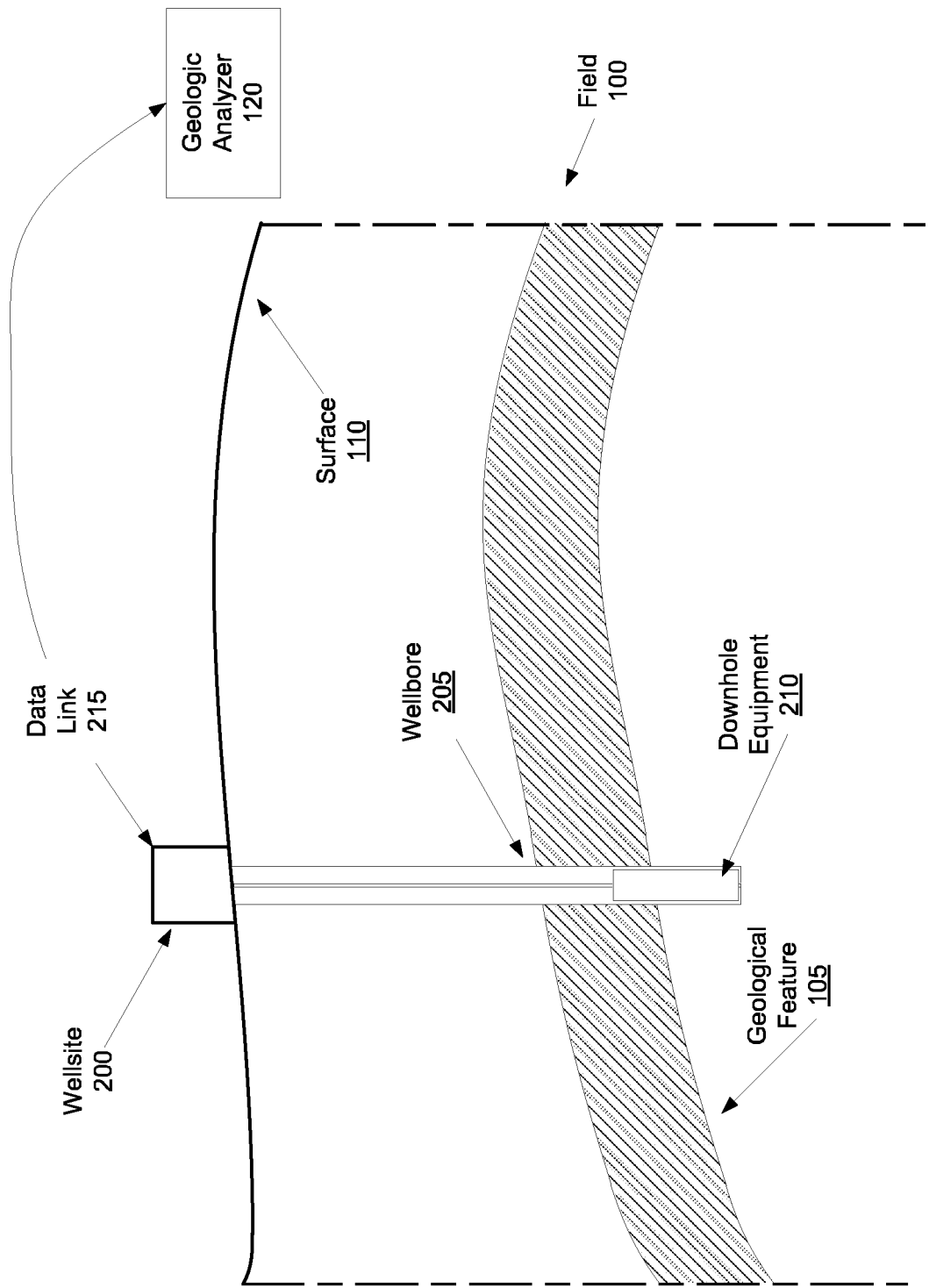
FIG. 2 shows a second schematic diagram of a wellsite in accordance with one or more embodiments.

In addition to the seismic data collector, one or more embodiments may include a wellsite (200) as shown in FIG. 2. the wellsite (200) may include and/or be associated with a rig (not shown), a wellbore (205), and downhole equipment that is configured to perform wellsite operations, such as logging, drilling, fracturing, production, and/or other applicable operations. The wellsite operations may be performed in accordance with an extraction plan.

In one or more embodiments, the wellsite may be connected to the geologic analyzer (120) by a data link (215). The data link (215) may be the same data link (135) shown in FIG. 1 or a different data link. The data link (215) may enable the geologic analyzer (120) to send the extraction plan to the wellsite (200) and/or modify an existing extraction plan at the wellsite (200). In one or more embodiments, the data link (215) may be an operable connection. For example, the operable connection may be a wired or wireless data communications link. In one or more embodiments, the data link may be a physical transfer of the extraction plan by way of physical transport of a non-transitory computer readable storage medium from the geologic analyzer (120) to the wellsite (200). The non-transitory computer readable storage medium, may be, for example, a universal serial bus flash memory stick, a memory card, or any other computer readable physical medium.

In one or more embodiments, the wellsite may include a field management tool (not shown) that is configured to control actions performed at the wellsite. The field management tool may be operably connected to, for example, the downhole equipment (210) and thereby control or otherwise direct the action of the equipment. Thus, the field management tool may cause wellsite operations to be performed in accordance with the extraction plan received from the geologic analyzer.

Figure 3:
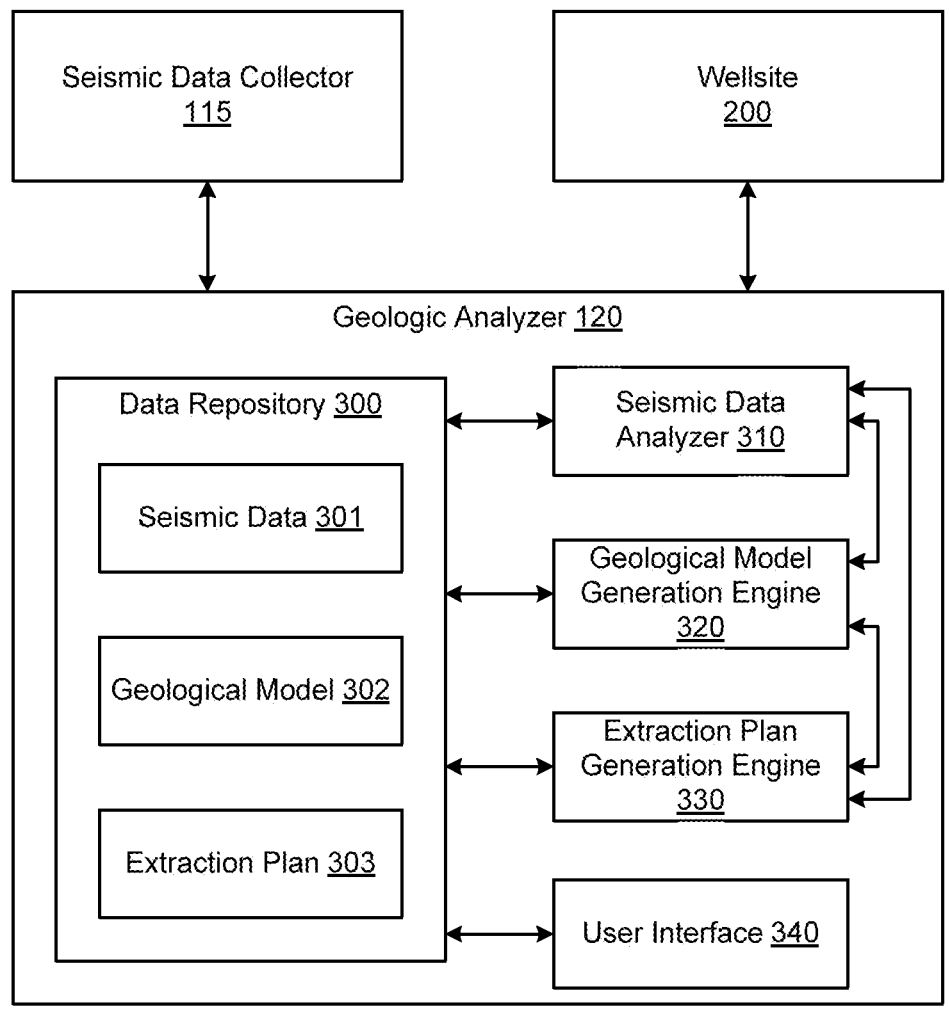
FIG. 3 shows a schematic diagram of a system in accordance with one or more embodiments.

FIG. 3 shows a schematic diagram of a system in accordance with one or more embodiments. In FIG. 3, lines represent operable connections between components. In other words, the operable connections represent at least some of the components that may share data and commands. The operable connections may be direct or indirect, through a network, through shared storage, through application programming interface (API) calls, intermittent or semi-permanent, or through any other type of connection. As shown in FIG. 3, the wellsite (200) is connected to the geologic analyzer (120) and thereby the field management tool may receive an extraction plan generated by the geologic analyzer (120). Similarly, the seismic data collector (115) is connected to the geologic analyzer (120) and, thereby, the geologic analyzer (120) may receive seismic data of the geologic formation.

As shown in FIG. 3, the geologic analyzer (120) includes a data repository (300), a seismic data analyzer (310), a geological model generation engine (320), an extraction plan generation engine (330), and a user interface (340). Each of these components is described below.

In one or more embodiments of the technology, the data repository (300) is any type of storage unit and/or device (e.g., a file system, database, collection of tables, or any other storage mechanism) for storing data. Further, the data repository (300) may include multiple different storage units and/or devices. The multiple different storage units and/or devices may or may not be of the same type or located at the same physical site.

The data repository (300) includes functionality to store a seismic data (301), a geological model (302), and an extraction plan (303) in accordance with one or more embodiments of the technology. In one or more embodiments of the technology, the geological model (302) may correspond to the geological formation discussed above with reference to FIGS. 1 and 2. In other words, the geological model (302) is an internal representation of a geological formation. The geological model (302) may further include information about the wellsite, e.g., existing wellbores, completion components installed in the wellbore, etc.

In one or more embodiments of the technology, the seismic data (301) are seismic data of the geologic formation. In one or more embodiments, the seismic data may be obtained from the seismic data collector (115, FIG. 1). The seismic data may be obtained from other sources or in a different manner without departing from embodiments of the technology. In one or more embodiments, the seismic data (301) may include multiple relations between received acoustic energy over time where each relation is generated by acoustic energy generators and receivers located at different locations relative to the geological formation.

In one or more embodiments of the technology, the seismic data (301) may also include spectral representations of the seismic data. In other words, the seismic data may be transformed by an operator to a spectral representation of a time domain relationship. For example, the operator may be a Fourier transformation. In one or more embodiments, the Fourier transformation may be a fast Fourier transformation.

In one or more embodiments of the technology, the extraction plan (303) is a set of wellsite actions. The wellsite actions may be any type of action that may be performed at the wellsite.

Continuing with FIG. 3, the seismic data analyzer (310) corresponds to hardware, software, firmware, or a combination thereof that includes functionality to generate a spectral decomposition of the seismic data and determine a characteristic of an operator used to generate the spectral decomposition. In one or more embodiments, the seismic data analyzer (310) includes functionality to perform at least the method shown in FIG. 7. In one or more embodiments, the characteristic of the operator may be a size of the operator, e.g., a frequency width of an operator. In one or more embodiments, the characteristic of the operator may be a center frequency of a discretization of the spectral decomposition that is closest to a frequency of interest of the spectral decomposition. In one or more embodiments, the frequency of interest may be set by a user via the user interface (340), as will be discussed in detail below.

Figure 4:
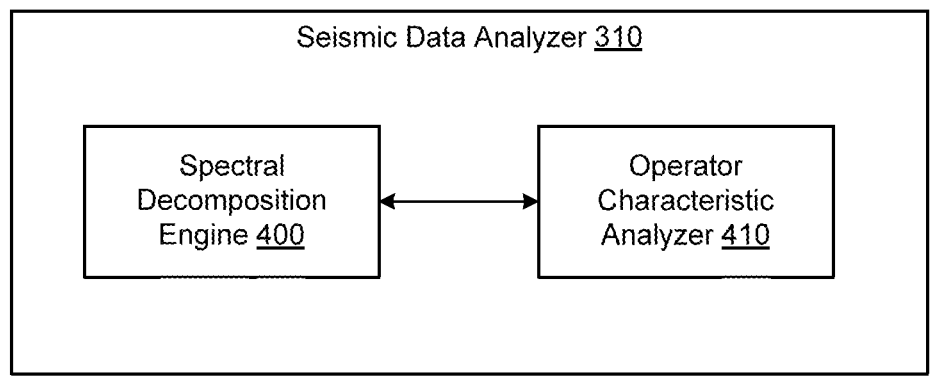
FIG. 4 shows a schematic diagram of a system in accordance with one or more embodiments.

To implement the functionality of the seismic analyzer (310), the analyzer may include a spectral decomposition engine (400) and an operator characteristic analyzer (310) as shown in FIG. 4 and in accordance with one or more embodiments.

Figure 12:
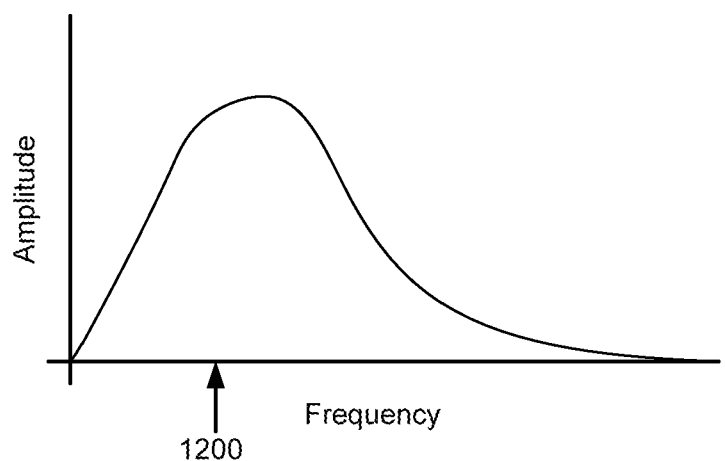
FIG. 12 shows a plot of a spectral representation of a seismic data in accordance with one or more embodiments.

In one or more embodiments, the spectral decomposition engine (400) is configured to generate a spectral representation of a time domain relationship. The spectral decomposition engine (400) may perform a fast Fourier transform to generate the spectral representation. For example, performing a fast Fourier transform by the spectral decomposition engine (400) may result in a magnitude versus frequency relationship shown in FIG. 12. FIG. 12 shows an example spectral representation of a time domain relationship, e.g., a spectral representation of a seismic data. The horizontal axis represents a frequency scale and the vertical axis represents an amplitude scale.

Returning to FIG. 4, in one or more embodiments, the spectral decomposition engine (400) may be configured to retrieve a seismic data (301) stored in the data repository. The seismic data (301) may specify an acoustic energy over time relationship, as discussed above. The spectral decomposition engine (400) may be configured to perform multiple fast Fourier transform operations using different operator sizes during each transformation, e.g., different time discretizations. Using different time discretizations when performing each transformation results in different frequency discretizations of the resulting transformation, e.g., results in a different operator size. In other words, changes to the time discretization result in changes to the frequency discretization. The spectral decomposition engine (400) may be configured to store each of the spectral representations as seismic data (301) in the data repository (300).

Figure 13:
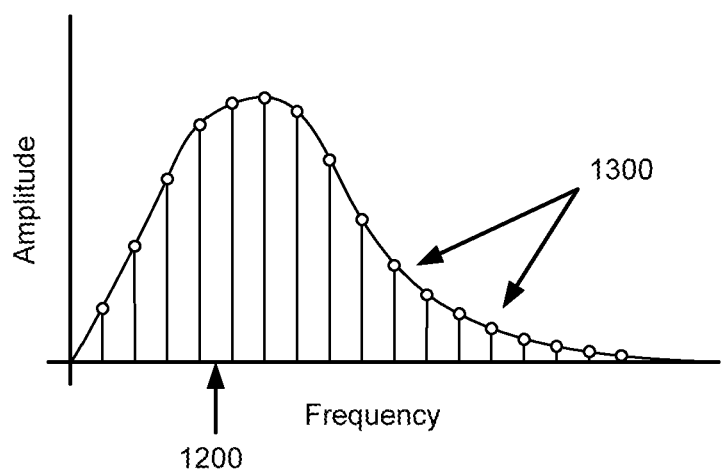
FIG. 13 shows a plot of a second spectral representation of the seismic data shown in FIG. 12 in accordance with one or more embodiments.
Figure 14:
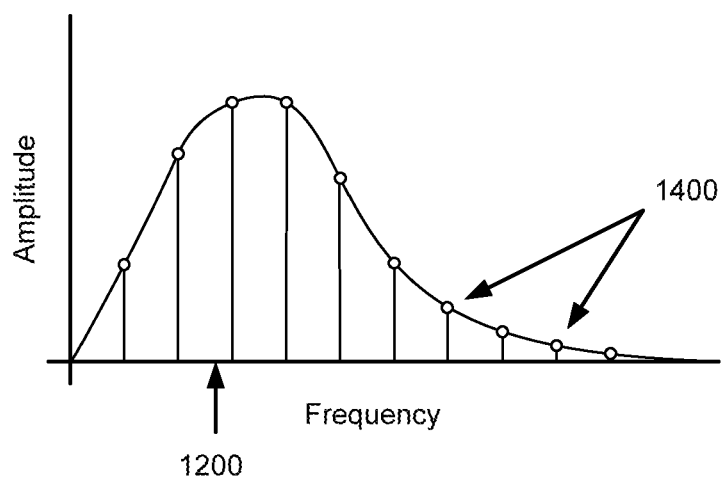
FIG. 14 shows a plot of a third spectral representation of the seismic data shown in FIG. 12 in accordance with one or more embodiments.

FIG. 13 shows an example (1300) of a spectral representation of a seismic data using a first operator size and FIG. 14 shows an example (1400) of a spectral representation of a seismic data using a second operator size. The second operator size is larger than the first operator size. In each of FIGS. 13 and 14, vertical markers (1300, 1400) have been added that indicate the center frequency of each discretization. As seen from FIG. 13, the discretization is finer, e.g., a greater number of markers, than the discretization shown in FIG. 14.

Returning to FIG. 4, in one or more embodiments, the operator characteristic analyzer (410) may be configured to determine a characteristic of an operator used to generate a spectral representation of a seismic data. In one or more embodiments, the characteristic of the operator may be a center frequency of a discretization of a spectral representation that is closest to the frequency of interest. In one or more embodiments, the characteristic of the operator may be an operator size, e.g., frequency bandwidth of the discretization of the spectral representation of the seismic data. The operator characteristic analyzer (410) may be further configured to store the determined operator characteristic in the data repository (300) and associated with a spectral representation on which the operator characteristic is based.

Returning to FIG. 3, in one or more embodiments of the technology, the geological model generation engine (320) corresponds to hardware, software, firmware, or a combination thereof that includes functionality to generate and/or modify a geologic model (302) of the geological formation based on the spectral representations of the seismic data and/or operator characteristics stored in the data repository (300). In one or more embodiments, the geological model generation engine (320) includes functionality to perform the method shown in FIG. 8.

Figure 5:
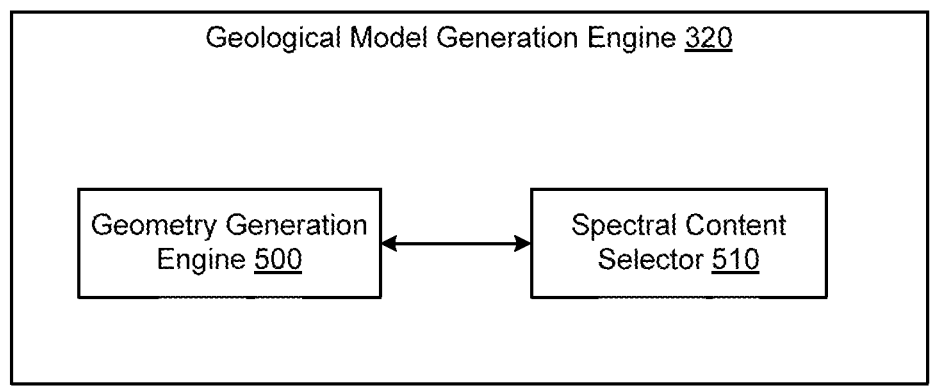
FIG. 5 shows a schematic diagram of a system in accordance with one or more embodiments.

To implement the functionality of the geological model generation engine (320), the engine may include a geometry generation engine (500) and a spectral content selector (510) as shown in FIG. 5 and in accordance with one or more embodiments.

In one or more embodiments, the geometry generation engine (500) is configured to generate features of a model of a geological formation based on seismic data selected by the spectral content selector (510). The features of the model may include one or more dip angles, azimuths, continuities, and/or seismic traces. Each of the aforementioned features may be geometric attributes that define one or more spatial relationships that represent the geological formation. The geometry generation engine (400) may use any method of generating the features of the model including, but not limited to, autocorrelation of iso-frequency attributes, coherence estimation, dip estimation, azimuth estimation, and curvature estimation.

Figure 15:
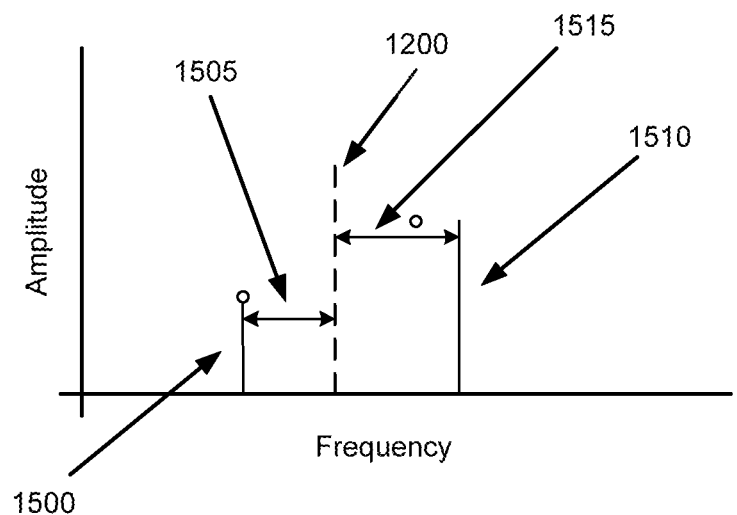
FIG. 15 shows a plot of a portion of the second spectral representation shown in FIG. 13, a portion of the third spectral representation shown in FIG. 14, and a frequency of interest in accordance with one or more embodiments.

In one or more embodiments, the spectral content selector (510) is configured to select a subset of the spectral representations of the seismic data generated by the seismic data analyzer (310, FIG. 4) based on a correlation between the center frequency of discretization and a frequency of interest. As shown in FIGS. 13 and 14, each spectral representation of a seismic data may have a different frequency discretization. Depending on the degree of discretization, there may be a difference between a center frequency of a discretization nearest a frequency of interest (1200) and the center frequency of the discretization. For example, as shown in FIG. 15, a frequency of interest (1200) of a spectral representation of a seismic data may be a frequency that is different from a first center frequency (1500) of a first discretization of a spectral representation of the seismic data. Additionally, the frequency of interest (1200) of the spectral representation of the seismic data may be a frequency that is different from a second center frequency (1510) of a second discretization of a spectral representation of the seismic data. Thus, as seen from FIG. 15, a correlation between the center frequency of a discretization of a spectral representation of a seismic data that is closest to a frequency of interest and the frequency of interest of the spectral representation depends on the discretization of the spectral representation.

Figure 16:
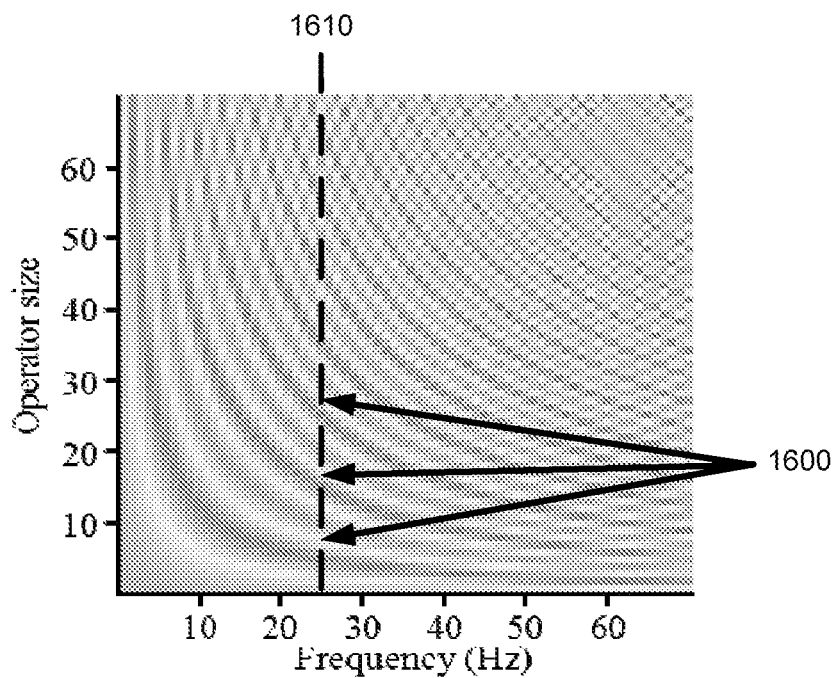
FIG. 16 shows an example of a contour plot of a correlation in accordance with one or more embodiments.

FIG. 16 shows a contour plot of the correlation between the center frequency of a discretization of a spectral representation closest to a frequency of interest of the spectral representation and the frequency of interest in accordance with embodiments. In FIG. 16, the horizontal axis represents a frequency of interest and the vertical axis represents an operator size, e.g., a size of the discretization of the spectral representation of the seismic data. The grayscale value of each pixel of the plot represents the magnitude of the correlation where lighter pixels represent better correlation. As seen from FIG. 16, there may be multiple operator sizes that provide a correlation (1600) for a given frequency of interest (1610). Similarly, there may be multiple operator sizes that do not correlate, e.g., dark pixels, with the given frequency of interest (1610).

Returning to FIG. 5, the spectral content selector (510) may be configured to select one or more spectral representations of the seismic data based on the correlation of the spectral representations and the frequency of interest. The spectral content selector (510) may notify the geometry generation engine (500) of the selected spectral representations. In one or more embodiments, the spectral content selector (510) may be configured to select multiple sets of spectral representations, each set selected for one of multiple frequencies of interest.

Returning to FIG. 3, in one or more embodiments of the technology, the extraction plan generation engine (320) corresponds to hardware, software, firmware, or a combination thereof that includes functionality to generate and/or modify an extraction plan (303) based on the geological model (302) stored in the data repository (300). In one or more embodiments, the extraction plan generation engine (330) includes functionality to perform the method shown in FIG. 9.

Figure 6:
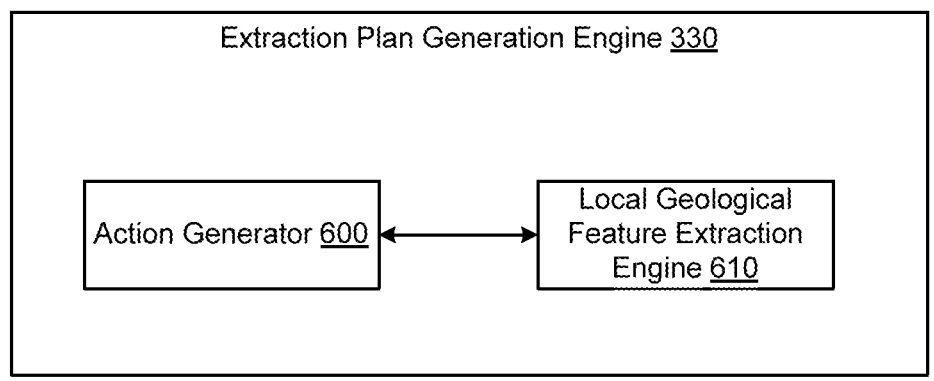
FIG. 6 shows a schematic diagram of a system in accordance with one or more embodiments.

To implement the functionality of the extraction plan generation engine (330), the engine may include an action generator (600) and a local geological feature extraction engine (610) as shown in FIG. 6 and in accordance with one or more embodiments.

In one or more embodiments, the action generator (600) is configured to generate wellsite actions, based on geological features of a geological model, and generate/modify an extraction plan based on the wellsite actions. The geological features may be provided by the local geological feature extraction engine.

In one or more embodiments, the local geological feature extraction engine (610) is configured to extract geological features of a geological model stored in the data repository (300). The geological features may be any feature of the geological model of a geological formation.

Returning to FIG. 3, in one or more embodiments of the technology, the user interface (340) may be configured to interact with a user. For example, the user interface may be a graphical user interface. Further, the user interface (340) may include functionality to receive information about one or more frequencies of interest and other aspects of the field operations. The user interface may further be configured to display output of the seismic data analyzer (310), the geological model generation engine (320), the extraction plan generation engine (330), and/or a combination thereof.

Figure 7:
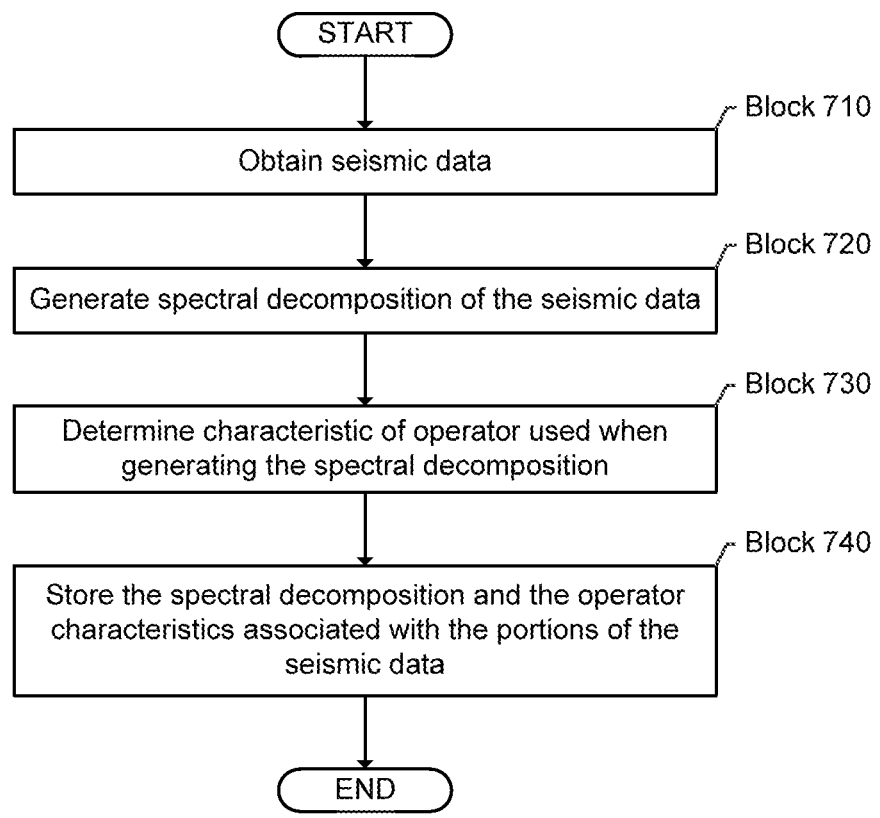
FIG. 7 shows a flowchart in accordance with one or more embodiments.

FIG. 7 shows a flowchart in accordance with one or more embodiments of the technology. The flowchart may illustrate a method. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments of the technology. By way of an example, determination blocks may not require a processor to process an instruction unless an interrupt is received to signify that condition exists in accordance with one or more embodiments of the technology. As another example, determination blocks may be performed by performing a test, such as checking a data value to test whether the value is consistent with the tested condition in accordance with one or more embodiments of the technology.

In Block 710, a seismic data associated with a geological formation is obtained. In one or more embodiments, the seismic data is obtained by a seismic data analyzer. In one or more embodiments, the seismic data is obtained from a seismic data collector. The seismic data collector may be, for example, a geophone. In one or more embodiments, the seismic data may be read from a data repository. The data repository may be stored on a computer readable non-transitory storage medium operably connected to the seismic data analyzer. The seismic data may be a received acoustic energy versus time relationship.

In Block 720, a spectral decomposition of the seismic data is generated. The spectral decomposition may be generated by the seismic data analyzer. The spectral decomposition may be generated by performing a fast Fourier transformation. The fast Fourier transformation may be performed utilizing an operator. The spectral decomposition may comprise a magnitude of acoustic energy received versus time relationship. Other transformation may be used to determine a spectral representation of the seismic data without departing from the technology.

In Block 730, a characteristic of the operator used in Block 730 is determined. In one or more embodiments, the characteristic is a size of the operator. In one or more embodiments, the characteristic is a center frequency of a discretization of the spectral representation nearest a frequency of interest.

In Block 740, the spectral decomposition of the seismic data and the characteristic of the operator are stored in the data repository. In one or more embodiments, the spectral decomposition of the seismic data and the characteristic of the operator are provided to a geological model generation engine.

Blocks 710-740 may be repeated multiple times and thereby generate multiple spectral representation of a seismic data. Each repetition may utilize a different operator size.

Figure 8:
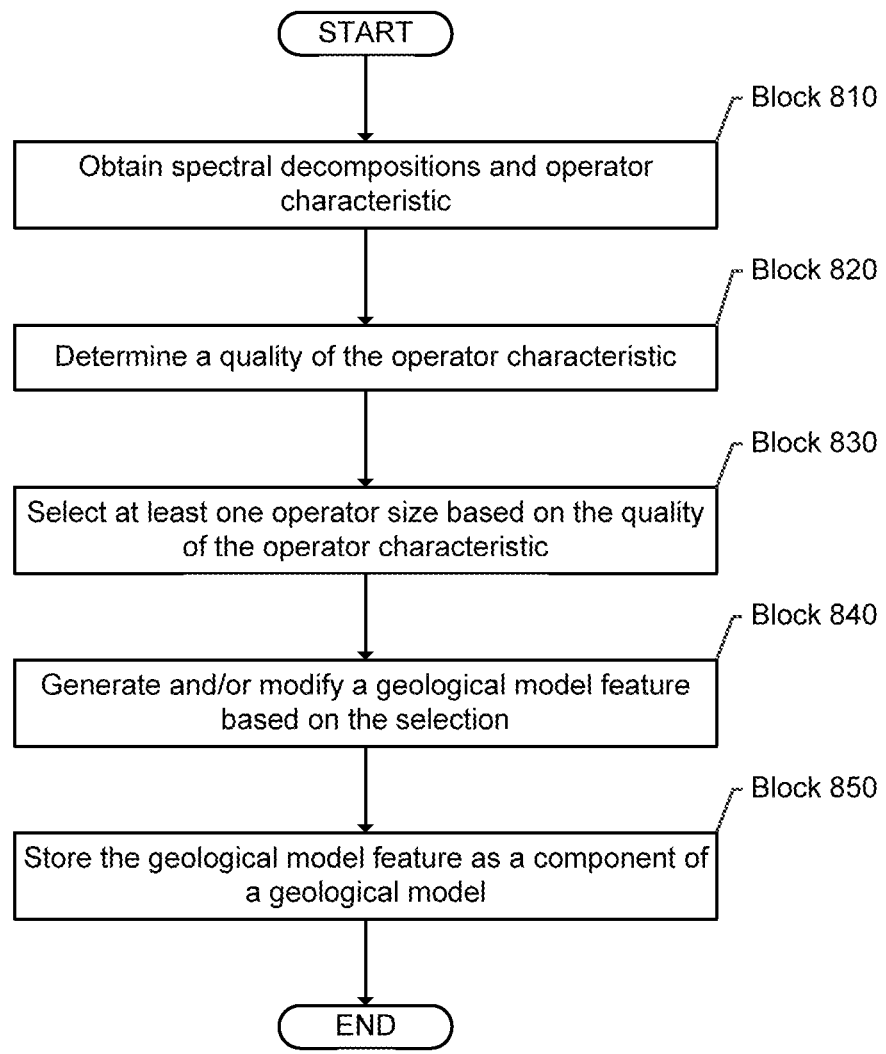
FIG. 8 shows a flowchart in accordance with one or more embodiments.

FIG. 8 shows a flowchart in accordance with one or more embodiments of the technology. The flowchart may illustrate a method. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments of the technology. By way of an example, determination blocks may not require a processor to process an instruction unless an interrupt is received to signify that condition exists in accordance with one or more embodiments of the technology. As another example, determination blocks may be performed by performing a test, such as checking a data value to test whether the value is consistent with the tested condition in accordance with one or more embodiments of the technology.

In Block 810, a spectral decomposition and operator characteristic associated with the spectral decomposition is obtained. In one or more embodiments, the operator characteristic is a characteristic of an operator used to generate the spectral decomposition. In one or more embodiments, the spectral decomposition and/or operator characteristic is/are obtained by a geological model generation engine. In one or more embodiments, the spectral decomposition and/or operator characteristic is/are obtained from a seismic data analyzer. In one or more embodiments, the spectral decomposition and/or operator characteristic is/are obtained by reading from a data repository. The data repository may be stored on a computer readable non-transitory storage medium operably connected to the geological model generation engine.

In Block 820, a quality of the operator characteristic is determined. The quality may be a correlation as shown and described with respect to FIGS. 15 and 16.

In Block 830, an operator size is selected based on the quality of the operator characteristic. In one or more embodiments, the quality may be compared to a predetermined value. The operator size may be selected if the quality is greater than the predetermined value.

In one or more embodiments, the quality may be ranked, e.g., compared to qualities of other operator characteristics. The operator size may be selected if the ranking is greater than a predetermined rank.

In one or more embodiments, the predetermined value and/or the predetermined rank may be set by a user.

In Block 840, a geological model feature is generated and/or modified based on the selection. In one or more embodiments, the geological model feature is generated and/or modified based on the selected spectral representations of the seismic data having operator sizes that are selected.

In Block 850, the geological model feature is stored as a component of a geological model. The geological model may be stored in the data repository.

Blocks 810, 820, 830, 840, and 850 may be repeated multiple times and select multiple operator sizes and thereby result in a geological model of a geological formation based on multiple spectral representations of seismic data that were each generated using an operator that correlates with a frequency of interest.

Figure 9:
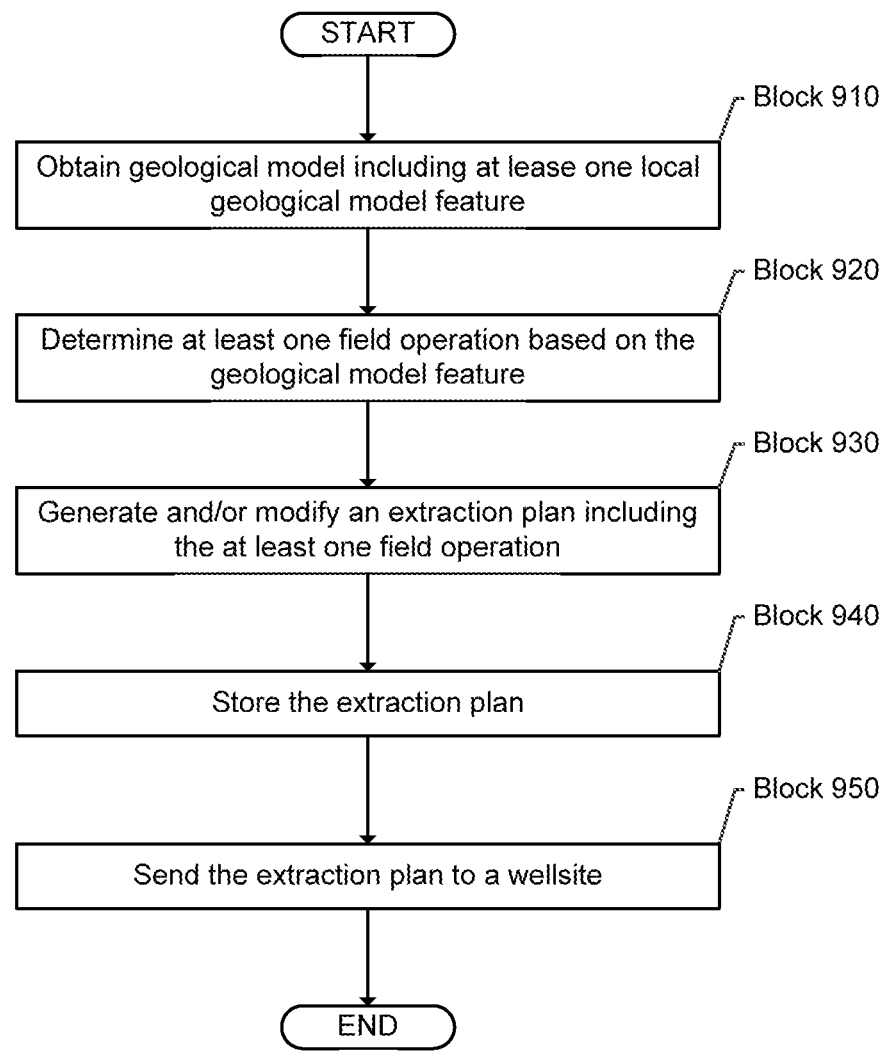
FIG. 9 shows a flowchart in accordance with one or more embodiments.

FIG. 9 shows a flowchart in accordance with one or more embodiments of the technology. The flowchart may illustrate a method. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments of the technology. By way of an example, determination blocks may not require a processor to process an instruction unless an interrupt is received to signify that condition exists in accordance with one or more embodiments of the technology. As another example, determination blocks may be performed by performing a test, such as checking a data value to test whether the value is consistent with the tested condition in accordance with one or more embodiments of the technology.

In Block 910, a geological model of a geological formation is obtained.

In one or more embodiments, the geological model includes at least one local geological model feature. In one or more embodiments, the geological model is obtained by an extraction plan generation engine. In one or more embodiments, the geological model is obtained by reading from a data repository. The data repository may be stored on a computer readable non-transitory storage medium operably connected to the extraction plan generation engine.

In Block 920, a field operation is determined based on the geological model feature of the geological model.

In Block 930, an extraction plan is generated/modified based on the field operation.

In Block 940, the extraction plan is stored. For example, the extraction plan may be stored in the data repository.

In Block 950, the extraction plan is send to a wellsite.

Figure 10:
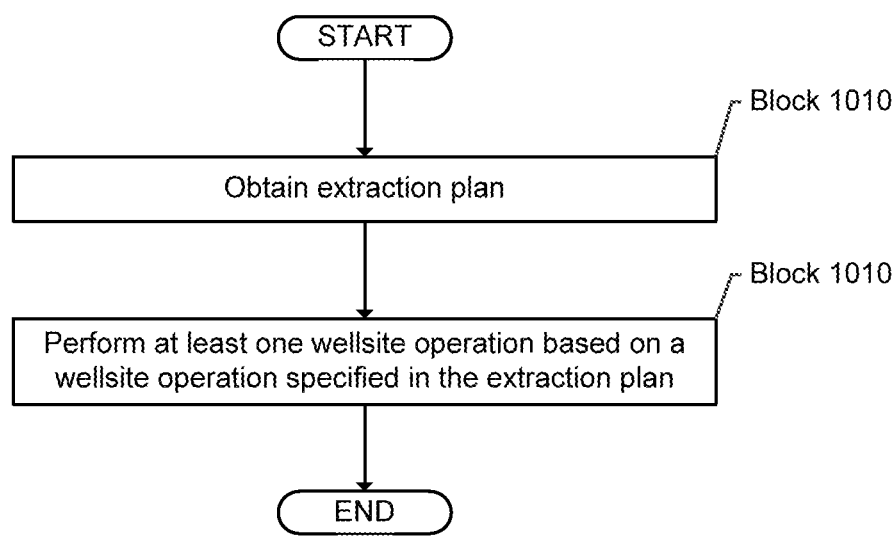
FIG. 10 shows a flowchart in accordance with one or more embodiments.

FIG. 10 shows a flowchart in accordance with one or more embodiments of the technology. The flowchart may illustrate a method. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments of the technology. By way of an example, determination blocks may not require a processor to process an instruction unless an interrupt is received to signify that condition exists in accordance with one or more embodiments of the technology. As another example, determination blocks may be performed by performing a test, such as checking a data value to test whether the value is consistent with the tested condition in accordance with one or more embodiments of the technology.

In Block 1010, an extraction plan is obtained. In one or more embodiments, the extraction plan includes at least one wellsite operation. In one or more embodiments, the extraction plan is obtained by a wellsite. In one or more embodiments, the extraction plan is obtained by an operable connection. In one or more embodiments, the extraction plan is obtained by reading a computer readable non-transitory storage medium on which the extraction plan is stored.

In Block 1020, a wellsite operation is performed based on the extraction plan. The wellsite operation may be, for example, boring of a wellbore at a specified location, installation of a completion component in an existing wellbore, or any other wellsite operation.

Figure 17:
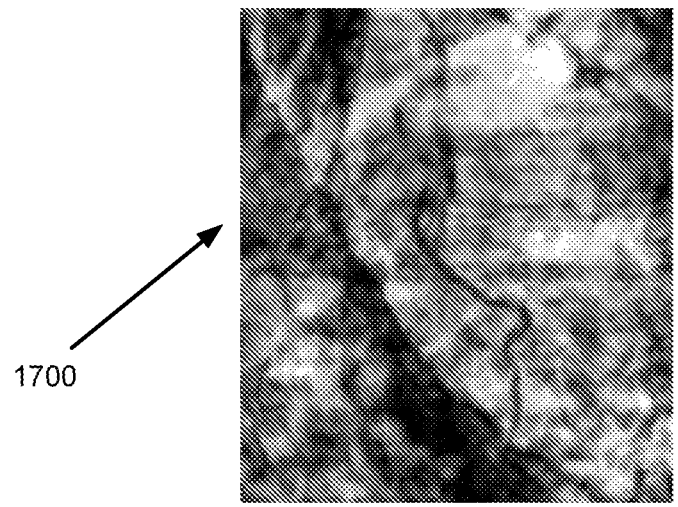
FIG. 17 shows an example of a geological model feature generated based on a contemporary method of geological model generation.

FIG. 17 shows a visualization (1700) of an example of a geological model generated by a contemporary method of geological model formation. The shading of the visualization indicates the presence of geological features.

Figure 18:
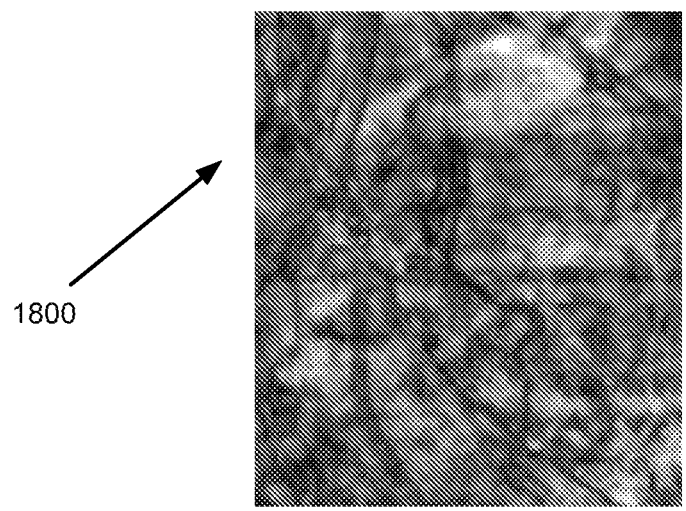
FIG. 18 shows an example of a geological model feature generated based on a method of geological model generation in accordance with one or more embodiments.

FIG. 18 show a visualization (1800) of an example of a geological model generated by a method in accordance with one or more embodiments of the technology. The shading of the visualization indicates the presence of geological features. In contrast to FIG. 17, the shading shown in FIG. 18 shows substantially sharper and more numerous geological features. More specifically, the shading shown in FIG. 18 illustrates numerous geological features that are not present in FIG. 17.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

One or more embodiments may be implemented on a computing system. Any combination of mobile, desktop, server, router, switch, embedded device, or other types of hardware may be used. For example, as shown in FIG. 11.1, the computing system (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), and numerous other elements and functionalities.

The computer processor(s) (1102) may be an integrated circuit for processing instructions. For example, the computer processor(s) may be one or more cores or micro-cores of a processor. The computing system (1100) may also include one or more input devices (1110), such as a touchscreen, keyboard, mouse, microphone, touchpad, electronic pen, or any other type of input device.

The communication interface (1112) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing systems exist, and the aforementioned input and output device(s) may take other forms.

Software instructions in the form of computer readable program code to perform one or more embodiments and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (1100) in FIG. 11.1 may be connected to or be a part of a network. For example, as shown in FIG. 11.2, the network (1120) may include multiple nodes (e.g., node X (1122), node Y (1124)). Each node may correspond to a computing system, such as the computing system shown in FIG. 11.1, or a group of nodes combined may correspond to the computing system shown in FIG. 11.1. By way of an example, embodiments may be implemented on a node of a distributed system that is connected to other nodes.

By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

Although not shown in FIG. 11.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126)

and transmit responses to the client device (1126). The client device (1126) may be a computing system, such as the computing system shown in FIG. 11.1. Further, the client device (1126) may include and/or perform a portion of one or more embodiments.

The computing system or group of computing systems described in FIGS. 11.1 and 11.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 11.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where a token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 11.1, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 11.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 11.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present a few examples of functions performed by the computing system of FIG. 11.1 and the nodes and/or client device in FIG. 11.2. Other functions may be performed using one or more embodiments.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims Further, while the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited by the attached claims.

What is claimed is:

1. A method for wellsite operations, comprising:
obtaining a spectral decomposition, of a seismic data associated with a geological formation, comprising:

a first spectral representation generated using a first operator, and a second spectral representation generated using a second operator, determining a first characteristic of the first operator and a second characteristic of the second operator;

performing a first correlation between the first characteristic and a frequency of interest and performing a second correlation between the second characteristic and the frequency of interest;

determining at least one acceptable operator based on the first and second correlations;

generating one or more geological model features using the at least one acceptable operator; and generating, based on the one or more geological model features, an extraction plan configured to be performed by a field management tool, wherein the extraction plan specifies a location of the wellbore.

2. The method of claim 1, wherein the first characteristic is determined by:
determining a center frequency of a discretization of the first spectral representation, and
determining a difference between the center frequency and a target frequency of the spectral decomposition, wherein the second characteristic is determined by:
determining a second center frequency of a second discretization of the second spectral representation, and
determining a second difference between the second center frequency and the target frequency of the spectral decomposition.

3. The method of claim 2, wherein the at least one acceptable operator is determined by:
making a first comparison between the first difference or the second difference to a predetermined value, and
selecting the acceptable operator based on the first comparison.

4. The method of claim 2, wherein the at least one acceptable operator is determined by:
ranking the first difference and the second difference, and
selecting the acceptable operator based on the ranking.

5. A system for extracting fluids, comprising:
a data repository for storing:
a geological model of a geological formation based on, in part, a seismic data associated with the geological formation; and
a computer processor, operatively connected to the data repository, for executing:
a seismic data analyzer that:
obtains a spectral decomposition, of the seismic data, using at least one operator, and
determines a characteristic of the at least one operator associated with the spectral decomposition,
a seismic content selector that:
performs a correlation between the characteristic and a frequency of interest;
a geological model generation engine that:
determines at least one acceptable operator based on the correlation, and
generates one or more geological model features using the at least one acceptable operator; and
an action generator that:
generate, based on the one or more geological model features, an extraction plan configured to be performed by a field management tool, wherein the extraction plan specifies a location of the wellbore.

6. The system of claim 5, wherein the spectral decomposition comprises a first spectral representation of the seismic data using a first operator size and a second spectral representation of the seismic data using a second operator size.

7. The system of claim 6, wherein the characteristic of the at least one operator is determined by:
determining a center frequency of a discretization of the first spectral representation of the seismic data, and
determining a difference between a center frequency and a target frequency of the spectral decomposition,
wherein the at least one acceptable operator is determined by comparing the difference to a predetermined difference.

8. The system of claim 5, wherein the characteristic of the at least one operator is further determined by:
determining a first center frequency of a discretization of the first spectral representation of the seismic data,
determining a second center frequency of a discretization of the second spectral representation of the seismic data,
determining a first difference between the first center and the target frequency,
determining a second difference between the second center frequency and the target frequency,
ranking the first difference and the second difference,
wherein the at least one acceptable operator is determined based on the ranking.

9. The system of claim 5, wherein the at least one operator is based on at least one operator size that specifies a discretization of a portion of the spectral decomposition.

10. The system of claim 9, wherein the portion of the spectral decomposition comprises a spectral representation of the seismic data using the at least one operator size.

11. The system of claim 10,
wherein the spectral decomposition comprises a second portion,
wherein the second portion comprises a second spectral representation of the seismic data using a second operator size of the at least one operator size,
wherein a discretization of the second spectral representation is different than a discretization of the first spectral representation.

12. A non-transitory computer readable medium for wellsite operations, the non-transitory computer readable medium comprising computer readable program code for:
obtaining a spectral decomposition, of a seismic data associated with a geological formation, comprising:
a first spectral representation generated using a first operator,
a second spectral representation generated using a second operator,
determining a first characteristic of the first operator and a second characteristic of the second operator,
performing a correlation between the first characteristic and a frequency of interest and performing a second correlation between the second characteristic and the frequency of interest;
determining at least one acceptable operator based on the first and second correlations;
generating one or more geological model features using the at least one acceptable operator; and
generating, based on the one or more geological model features, an extraction plan configured to be performed by a field management tool, wherein the extraction plan specifies a location of the wellbore.

* * * * *